(12) United States Patent
Zhang

(10) Patent No.: US 7,641,427 B2
(45) Date of Patent: Jan. 5, 2010

(54) INSERT FOR A SANDWICH COMPONENT HAVING A HONEYCOMB CORE

(75) Inventor: Li Zhang, Ulm (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/088,981

(22) PCT Filed: Oct. 19, 2006

(86) PCT No.: PCT/EP2006/010115

§ 371 (c)(1),
(2), (4) Date: Sep. 17, 2008

(87) PCT Pub. No.: WO2007/045484

PCT Pub. Date: Apr. 26, 2007

(65) Prior Publication Data

US 2009/0220320 A1    Sep. 3, 2009

(30) Foreign Application Priority Data

Oct. 19, 2005    (DE) .................. 10 2005 050 143

(51) Int. Cl.
*F16B 13/04*    (2006.01)
(52) U.S. Cl. ........................ 411/21; 411/82.1
(58) Field of Classification Search ............. 411/21–23, 411/357–359, 930

See application file for complete search history.

(56) References Cited

U.S. PATENT DOCUMENTS

| | | | |
|---|---|---|---|
| 1,236,538 A | * | 8/1917 | Brown .................... 403/280 |
| 3,766,636 A | | 10/1973 | Sygnator |
| 4,644,617 A | * | 2/1987 | Tupper et al. ................ 24/611 |
| 5,378,099 A | | 1/1995 | Gauron |
| 6,602,033 B2 | * | 8/2003 | Nettis et al. .................. 411/21 |

FOREIGN PATENT DOCUMENTS

| | | |
|---|---|---|
| DE | 2911058 | 9/1980 |
| DE | 3108197 | 12/1981 |
| DE | 20001437 | 5/2000 |
| FR | 2815322 | 4/2002 |

OTHER PUBLICATIONS

International Search Report, PCT Form Nos. PCT/ISA/220 (Notification of Trasmittal), PCT/ISA/210 (International Search Report), and PCT/ISA/237 (Written Opinion).

* cited by examiner

*Primary Examiner*—Gary Estremsky
(74) *Attorney, Agent, or Firm*—Wood, Herron & Evans, L.L.P.

(57) ABSTRACT

An insert (10) for a sandwich component (30) having a honeycomb core (31) has an inner hollow-cylindrical sleeve (12). To improve the force-transmitting ability between the insert (10) and the sandwich component (30), the insert (10) further has an outer sleeve (16) which is connected to the inner sleeve (12) by means of a plurality of radial webs (18) forming a plurality of axial chambers (20). Introduction of a push-in part (32) into the chambers (20), cause the anchor elements to exit, with their pointed end (24) in front, through exit openings (28) radially out of the chambers (20).

14 Claims, 2 Drawing Sheets

INSERT FOR A SANDWICH COMPONENT HAVING A HONEYCOMB CORE

Figure 1:
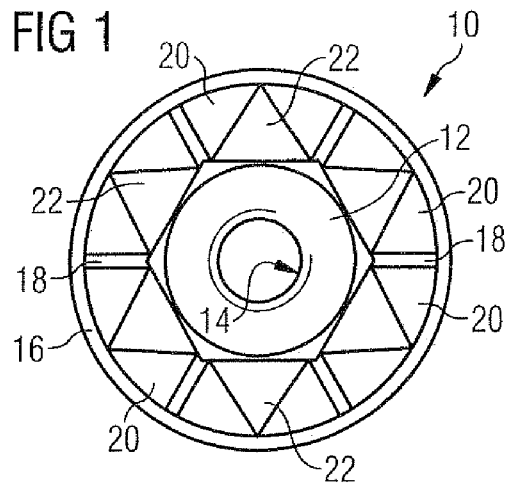

The invention relates to an insert for a sandwich component which has a honeycomb core. Such sandwich components are light and rigid, for which reason they are frequently employed particularly in aircraft construction. By way of example, luggage compartments, partition walls and the like in the cabin area of a passenger aircraft are produced from such sandwich components.

Sandwich components customary in aircraft construction comprise two thin so-called prepregs as an outer skin, between which are situated honeycombs, which may consist, for example, of paper impregnated with synthetic resin. Prepregs are fibre-boards impregnated with synthetic resin. Obviously, with such a structure, it is not possible to fasten structural elements such as, for example, holders to the sandwich component by means of customary connecting techniques (e.g. by screws), since the customary connecting means do not find adequate support in the sandwich material. It is therefore known to use inserts at those points in a sandwich component where structural elements are to be attached. An insert is in particular a part in the form of a bush, which is inserted into a bore previously produced in the sandwich component and is then bonded in the bore. The strength of the bonding plays a crucial role in the ability to absorb or transmit force in the force flow path from the sandwich component via the insert to a structural component, for example a holder. Factors which influence the load-bearing capacity of the bonding are, for example, the strength of the adhesive used, the thickness of prepreg and honeycomb and also the geometry of the insert itself.

Various procedures are known for increasing the strength of connection of inserts for the purpose of a higher force-transmitting ability. For example, instead of a single insert a plurality of inserts can be used to fasten a given component, so that each individual insert has a smaller proportion of force to transmit. Furthermore, in the region in which an insert is to be fitted, the outer skin of the sandwich component can be strengthened by using a double prepreg. Finally, a core-filling compound can be injected into the region around the bonding, i.e. the cavities in the honeycomb material between the two outer skins of the sandwich component are filled by means of the core-filling compound in order to provide increased strength in the region of the bond. If all these procedures, which may also be employed in combination, are not sufficient, then the sandwich material can also be replaced by a sheet made of pure laminate material in the region of inserts. All these procedures result in a markedly increased production outlay and also additional weight.

The object underlying the invention is therefore to provide an insert for a sandwich component having a honeycomb core, which enables a markedly improved strength of connection without considerable increase in labour and weight.

This object is achieved according to the invention by an insert which has the features specified in Claim 1. In addition to a hollow-cylindrical sleeve called here the inner sleeve, as known from conventional inserts, the insert according to the invention accordingly has an outer sleeve which is arranged concentrically and with radial spacing with respect to the inner sleeve and the inner side of which is connected to the outer side of the inner sleeve by means of a plurality of radial webs. Formed between the inner sleeve and the outer sleeve are a plurality of chambers which are distributed over the circumference of the insert and extend (in addition to their radial extension between the inner sleeve and the outer sleeve) axially along the insert, each chamber being bounded in the circumferential direction of the insert by two webs following each other in the circumferential direction. Each chamber is open at least on one of its end sides. In some or all of the chambers there is received in each case one anchor element which has a pointed end and a blunt end, the blunt end being adjacent to the open end side of the associated chamber. A part of each anchor element can exit, with its pointed end in front, from the associated chamber through a plurality of exit openings in the lateral surface of the outer sleeve. A push-in part which can be introduced axially through the open end sides of the chambers into the chambers is designed such that, upon introduction into the chambers, it comes into contact with the blunt ends of the anchor elements and displaces the anchor elements upon further introduction. Guiding devices in each chamber containing an anchor element ensure that, upon the displacement of the anchor elements brought about by the introduction of the push-in part into the chambers, the anchor elements exit, with their pointed end in front, through the exit openings radially out of the chambers. In this way, in the finally installed state of the insert according to the invention, the anchor elements project radially out of the insert into the honeycomb core of the sandwich component. As a result, on the one hand better anchorage of the insert in the sandwich component is achieved and on the other hand the bonding diameter which arises upon the subsequent bonding of the insert in the sandwich component is markedly enlarged. Owing to the bonding diameter enlarged in particular by the anchor elements of the insert according to the invention, the strength of connection achieved between the insert and the sandwich component is significantly increased.

Preferably, at least three anchor elements are arranged in a star shape over the circumference of the insert. Particularly preferably, five or six anchor elements are employed, since the effect achieved according to the invention is obviously increased and evened out by a larger number of anchor elements.

In preferred embodiments of the insert according to the invention, each anchor element is received substantially vertically in the associated chamber and, after the exiting through the associated exit opening brought about by its displacement, assumes a substantially horizontal position. The terms "vertical" and "horizontal" relate here to a horizontally arranged sandwich component in which an insert is received as shown in the appended figures. By "received substantially vertically" it is not meant that an anchor element has to be received completely vertically in its chamber; rather, this expression also includes an oblique arrangement of the anchor element in the chamber which is still substantially vertical however compared with the subsequent horizontal position. Similarly, the expression "substantially horizontal position" does not means that each anchor element has to be arranged completely horizontally after its displacement; rather, a markedly more horizontal position compared with the previous vertical position is entirely sufficient to achieve the desired effect.

As already mentioned, each anchor element has a pointed end in order to be able to bore its way effectively into the honeycomb core and in doing so cause as little damage as possible to the structure of the honeycomb core. The blunt end of each anchor element serves as a point of contact for the push-in part bringing about the displacement of the anchor element. According to a preferred configuration, each anchor element has an arrowhead-like shape with a triangular cross-section. In other words, starting from a virtually punctiform vertex, the triangular cross-section of such an anchor element increases continuously, it being the case that the anchor element does not have to be completely closed, but can be open for example at its lower side, so that less material has to be displaced upon penetration into the honeycomb core. Even if the anchor elements are of completely closed design, they are preferably hollow to save weight.

In preferred embodiments of the insert according to the invention, the guiding devices in each chamber containing an anchor element comprise guiding ribs which project into the chamber from the webs laterally bounding the chamber and extend axially. Preferably, the guiding ribs extend axially as far as into the region of the exit openings, but do not span the exit openings completely. It is thereby ensured that the anchor elements in a final phase of their displacement are no longer in engagement with the guiding ribs.

If the guiding devices comprise guiding ribs, these guiding ribs preferably interact with guiding grooves formed on the respective anchor element. According to an advantageous embodiment, in this case the guiding grooves of each anchor element have sufficient play with respect to the guiding ribs to enable, during the displacement of the anchor elements brought about by the introduction of the push-in part into the chambers, a rotation of each anchor element from its substantially vertical position in the direction of the horizontal position. In this way, each anchor element is guided by the interaction of guiding grooves and guiding ribs and nevertheless can assume an increasingly more horizontal position after its point has exited through the aforementioned exit openings.

In preferred embodiments of the insert according to the invention, the guiding devices in each chamber containing an anchor element further have a ramp which is arranged, in the region of the exit openings which is not spanned by the guiding ribs (i.e. in the region in which, if the exit opening is projected onto the plane of the guiding ribs, no more guiding ribs are present). This ramp is arranged in such a way that the anchor element in a final phase of its displacement comes into sliding contact with the ramp and in so doing is displaced radially outwards. The ramp thus "pushes" the anchor element in a radially outward direction without the anchor element, however, completely leaving the chamber in the process. For example, in the end position of the displaced anchor element, two-thirds or else three-quarters of its length can project from the exit opening, while the rest of the anchor element is still situated in the chamber.

Preferably, the aforementioned ramps are fixedly attached to the outer side of the inner hollow-cylindrical sleeve. The blunt end of each anchor element then runs, in the final phase of its displacement in which it is no longer in engagement with the guiding ribs, onto the ramp and slides down the ramp upon its further displacement, with the result that it is moved radially outwards.

The guiding devices in each chamber containing an anchor element also include, according to a preferred embodiment, a stop which is arranged at the axial end, opposite the pointed end of the anchor element, of the associated exit opening and guides the pointed end of the anchor element, in an initial phase of its displacement, out through the associated exit opening. According to an advantageous configuration, this stop, in the final phase of the displacement of the anchor element, also fixes the horizontal end position of the anchor element. The stop in this case acts as an abutment, against which the anchor element is pressed by means of the push-in part.

In order to facilitate the bonding of an insert according to the invention to a sandwich component, the push-in part has, in a covering surface which closes the open end sides, facing the push-in part, of the chambers, injection openings which pass through the covering surface and are in communication with the chambers. Adhesive can thus be easily injected from outside into the chambers through the injection openings, runs down into the chambers and over the then horizontal anchor elements into the surrounding region of the honeycomb core, resulting in overall large-area bonding with a bonding diameter which is enlarged as compared with conventional inserts.

Figure 2:
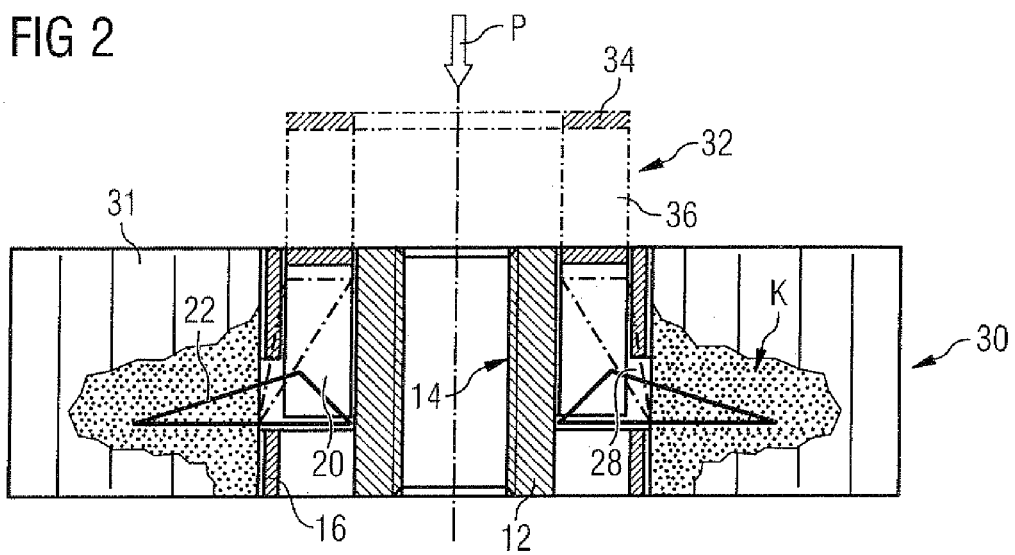
Figure 3:
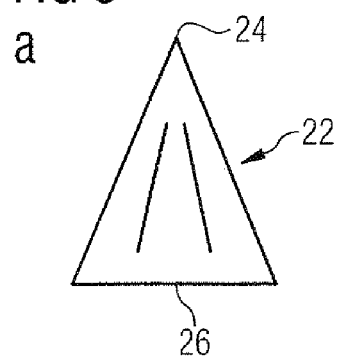
Figure 3:
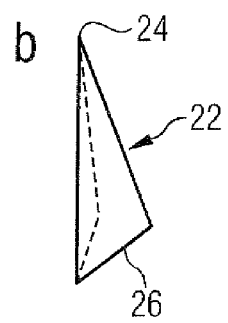
Figure 3:
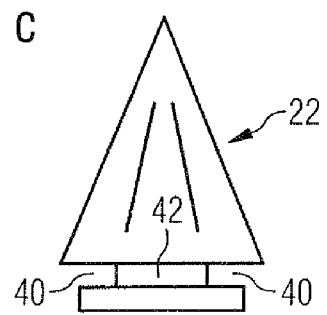
Figure 4:
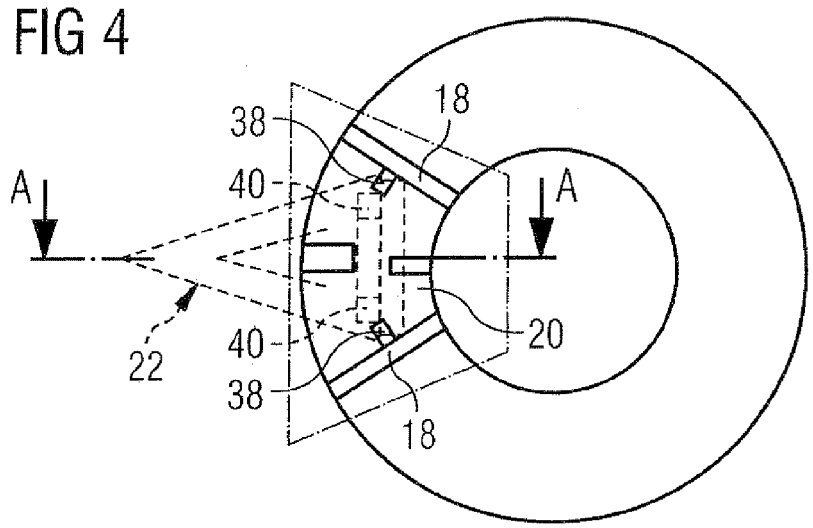
Figure 5:
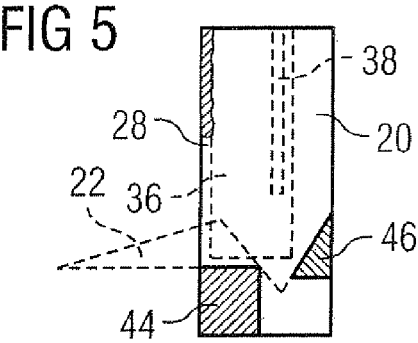
Figure 6:
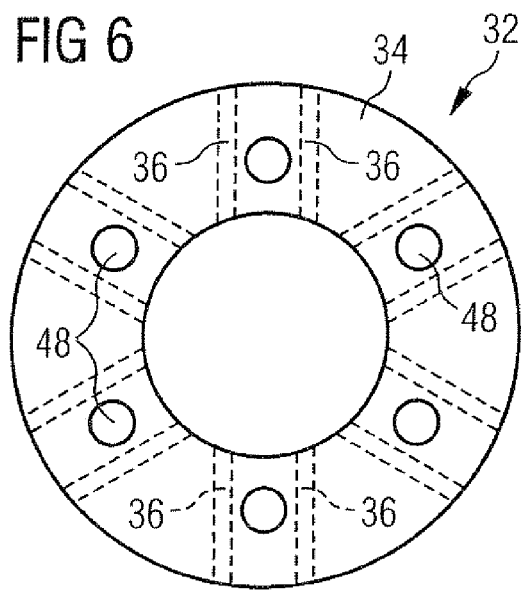

A preferred exemplary embodiment of an insert according to the invention is explained in more detail below with reference to the appended, schematic figures, in which:

FIG. 1 shows a plan view of an insert according to the invention,

FIG. 2 shows the insert from FIG. 1 in vertical section, anchor elements of the insert being depicted in a starting and end position, FIG. 3a shows a plan view of an anchor element of the insert from FIG. 1, FIG. 3b shows a three-dimensional illustration of the anchor element from FIG. 3a, FIG. 3c again shows a plan view of an anchor element corresponding to FIG. 3a, but in a more detailed illustration, FIG. 4 shows a plan view similar to FIG. 1, elucidating the interaction of anchor element and insert, FIG. 5 shows the axial section A-A from FIG. 4 through an insert chamber containing an anchor element, and FIG. 6 shows a plan view of the push-in part shown in FIG. 2.

FIG. 1 shows, in a view from above, an insert denoted generally by 10. The insert 10 is a part which allows the attachment, to a sandwich component having a honeycomb core, of other components, for example a holder, in such a way that forces can be transmitted between the sandwich component and the other component. The insert thus constitutes so to speak a point of connection between the sandwich component and another component to be attached thereto.

The insert 10 has an inner hollow-cylindrical sleeve 12, the through-opening 14 of which can be designed, for example, as a threaded bore. Arranged concentrically with respect to the inner sleeve 12, with radial spacing, is an outer, likewise hollow-cylindrical, sleeve 16, the inner side of which is connected to the outer side of the inner sleeve 12 by means of a plurality of (in this case six) radial webs 18. The inner sleeve 12, the outer sleeve 16 and the webs 18 connecting the two sleeves 12, 16 form the basic structure of the insert 10.

Formed between the inner sleeve 12 and the outer sleeve 16 are a plurality of (in this case six) chambers 20 which are laterally bounded by in each case two webs 18 following each other in the circumferential direction and the main direction of extension of which runs axially. In the exemplary embodiment shown (see FIGS. 1 and 2), the end sides of all the chambers 20 are open, but the lower end sides can also be closed.

Received in each chamber 20 is an anchor element 22, illustrated more precisely in FIG. 3. Each anchor element 22 has a pointed end 24 and a blunt end 26. In the exemplary embodiment shown, the anchor elements 22 consist of sheet steel and have a substantially triangular cross-section with an open lower side. The overall shape of each anchor element 22 accordingly resembles an arrowhead.

In an initial position, the anchor elements 22 are received in a substantially vertical position in the chambers 20 in such a way that their blunt end 26 is adjacent to the upper open end side of the associated chamber 20, whereas their pointed end 24 is situated close to an exit opening 28 (see also FIG. 5) of the chamber 20, which opening is present in the lateral surface of the outer sleeve 16. This initial position of each anchor element 22 is depicted in FIG. 2 by a dotted outline. It can be seen that the anchor elements 22 in their initial position are arranged slightly obliquely in the chambers 20.

As can be seen from FIG. 2, the insert 10 in its installed state is received in a sandwich component 30 having a honeycomb core 31. Before fitting the insert 10, the sandwich component 30 is provided with a bore, the diameter of which is minimally greater than the outside diameter of the outer sleeve 16 of the insert 10. The insert 10 is then inserted into this bore and subsequently bonded in the sandwich component 30.

In order to obtain better anchorage of the insert 10 in the sandwich component 30 and a greater bonding diameter, which increases the strength of the connection between the insert 10 and the sandwich component 30, the anchor elements 22 have to be brought from their initial position depicted by dotted lines in FIG. 2 into an end position depicted by continuous lines in FIG. 2, in which they assume a horizontal position and project with the greater part of their longitudinal extent radially out of the insert 10.

The transfer of the anchor elements 22 from their initial position into their end position is achieved by a displacement of the anchor elements 22 which is brought about by a push-in part 32, which is depicted by dotted lines in axial section in FIG. 2 and which can be introduced into the insert 10 from above. As can be seen more clearly from FIG. 6, this push-in part 32 comprises an annular cover 34, from the lower side of which there extend in the axial direction a plurality of groups of in each case two walls 36, the width of which corresponds at least substantially to the width of the annulus from which the cover 34 is formed. Each group of in each case two, here mutually parallel, walls 36 is arranged in such a way that it can penetrate into an associated chamber 20 and come into contact there with the blunt end of an anchor element 22 situated in the chamber 20, in order to displace the anchor element 22. In the exemplary embodiment shown, there are thus six groups of walls 36, corresponding to the number of chambers 20. The walls 36 serve so to speak as pushers, by which the anchor elements 22 are displaced during a movement of introduction of the push-in part 32 in the direction of an arrow P.

In order that the anchor elements 22, from their substantially vertical initial position with regard to FIG. 2, reach their horizontal end position in a defined manner, each chamber 20 contains guiding devices. These guiding devices comprise two guiding ribs 38, in each case one of which projects from each of the two webs 18 laterally bounding the chamber 20 into the chamber 20 (see FIG. 4). Each guiding rib 38 thus extends axially along a web 18 and projects perpendicularly from this web 18 into the chamber 20. As can be seen from FIG. 5, the guiding ribs 38 extend as far as into the region of the exit opening 28 of a chamber 20, but do not span the exit opening 28.

For interaction with the guiding ribs 38, the anchor element 22 has two guiding grooves 40 which—as can be seen from FIG. 3c—are formed by an extension 42 of T-shaped cross-section which is attached to the blunt end 26 of the anchor element 42. In the initial position of the anchor element 22, the guiding ribs 38 engage in the guiding grooves 40.

Likewise part of the guiding devices which are present in each chamber 20 containing an anchor element 22 is a stop 44 which is arranged in the region of the lower end of the exit opening 28 with regard to FIGS. 2 and 5 and extends from the radially outer edge of the chamber 20 radially inwards into the chamber 20. In the initial position of the anchor element 22, its pointed end 24 rests on the stop 44 close to the exit opening 28.

Finally, the guiding devices also include a ramp 46 which is fastened to the radially inner edge of the chamber 20 and is arranged in that region of the axial extent of the chamber 20 covered by the exit opening 28 which is not spanned by the guiding ribs 38 (see FIG. 5). The ramp 46 accordingly begins, with respect to the axial extent of a chamber 20, approximately where the guiding ribs 38 end, preferably somewhat beneath this point, and then projects with increasing axial distance from the guiding ribs 38 further and further radially into the chamber 20. The ramp 46 has the greatest radial extent at approximately the point (preferably somewhat therebelow) at which, seen axially, the stop 44 is situated.

Hereinbelow, the sequence of movements which occur upon introduction of the push-in part 32 into the insert 10 will now be described in more detail. As already mentioned, upon introduction of the push-in part 32 into the chambers 20 which are open at the top end side, first of all the groups of walls 36 come into contact with the blunt end 26 of each anchor element 22. Further pushing-in of the push-in part 32 in the direction of the arrow P then ensures that the anchor elements 22 are displaced downwards and radially outwards. In this process, the stops 44 in an initial phase of the displacement ensure that the pointed ends 24 of the anchor element 22 exit radially from the chambers 20 through the assigned exit openings 28. During the now following, further displacement, the lower side of each anchor element 22 is supported on the lower edge of the associated exit opening 28, while the rear, blunt end 26 is guided downwards in a controlled manner in the chamber 20 by the interplay of the guiding ribs 38 with the guiding grooves 40. Sufficient mechanical play exists here between the guiding ribs 38 and the guiding grooves 40 to enable the anchor element 22 during its downward displacement to rotate from the initially substantially vertical position increasingly into a horizontal position, in the course of which the pointed ends 24 of the anchor elements 22 bore their way into the honeycomb core 31 of the sandwich component 30.

Upon further downward displacement of the anchor elements 22, caused by further pressing-in of the push-in part 32 from above, the guiding grooves 40 finally become disengaged from the guiding ribs 38 and the rear, blunt end 26 of each anchor element 22 subsequently comes to rest on the ramp 46. In the now following final phase of the displacement of the anchor elements 22, the latter slide down on the ramp 46 by their rear end, caused again by further pressing-in of the push-in part 32, with the result that they are pushed radially outwards out of the associated chamber 20. FIG. 5 shows with a dashed outline the end position of the anchor elements 22, which is reached when the rear end of the anchor element 22 has slid completely down the ramp 46 and when the walls 36 of the push-in part 32 press the anchor element 22 by its lower side against the stop 44, which thus fixes the horizontal end position of the anchor element 22. In this end position, approximately two-thirds to three-quarters of the longitudinal extent of an anchor element 22 project radially out of the insert 10. Viewed from above, the anchor elements 22 thus project in a star shape out of the insert 10 into the honeycomb core 31.

Now, for final fastening of the insert 10 in the sandwich component 30, adhesive can be introduced into the insert 10 through injection openings 48 which are formed in the cover 34 of the push-in part 32 and are each in communication with a chamber 20 situated therebelow. The injected adhesive runs downwards in the chamber 20 and over the anchor elements 22 and out of the exit openings 28 into the honeycomb core 31 (see the dotted region marked by K in FIG. 2) and thus bonds the insert 10 over a large area and with a large bonding diameter in the sandwich component 30.

The invention claimed is:

1. Insert (10) for a sandwich component having a honeycomb core, having:
   an inner hollow-cylindrical sleeve (12),
   an outer sleeve (16) which is arranged concentrically and with radial spacing with respect to the inner sleeve (12) and the inner side of which is connected to the outer side of the inner sleeve (12) by means of a plurality of radial webs (18),
   a plurality of axial chambers (20), distributed over the circumference of the inset, between the inner sleeve (12) and the outer sleeve (16), each chamber (20) being bounded in the circumferential direction of the insert by two webs (18) following each other in the circumferential direction, and being open at least on one of its end sides,
   a plurality of anchor elements (22), in each case one of which is received in an associated chamber (20), each anchor element (22) having a pointed end (24) and a blunt end (26) and the blunt end being adjacent to the open end side of the chamber (20),
   a plurality of exit openings (28) in the lateral surface of the outer sleeve (16), through which a part of each anchor element (22) can exit, with its pointed end (24) in front, from the associated chamber (20),
   a push-in part (32) which can be introduced axially through the open end sides of the chambers (20) into the latter and is designed such that, upon introduction into the chambers (20), it comes into contact with the blunt ends (26) of the anchor elements (22) and displaces the latter, and
   guiding devices in each changer (20) containing an anchor element (22), which devices, upon a displacement of the anchor elements (22) brought about by the introduction of the push-in part (32) into the chambers (20), cause the anchor elements to exit, with their pointed end (24) in front, through the exit openings (28) radially out of the chambers (20).

2. Insert according to claim 1, characterised in that at east three anchor elements (22) are arranged in a manner distributed over the circumference of the insert.

3. Insert according to claim 1, characterised in that each anchor element (22) is received substantially vertically in the associated chamber (20) and, after the exiting through the associated exit opening (28) brought about by its displacement, assumes a substantially horizontal, position.

4. Insert according to claim 1, characterised in that each anchor element (22) has an arrowhead-like shape with a rectangular cross-section.

5. Insert according to claim 1, characterised in that the anchor elements (22) are hollow.

6. Insert according to claim 1, characterised in that the guiding devices in each chamber (20) containing an anchor element (22) comprise guiding ribs (38) which project into the chamber (20) from the webs (18) laterally bounding the chamber (20) and extend axially.

7. Insert according to claim 6, characterised in that the guiding ribs (38) extend axially as far as into the region of the exit openings (28), but do not span the latter completely.

8. Insert according to claim 6, characterised in that the guiding ribs (38) interact with guiding grooves (40) formed on the respective anchor element (22).

9. Insert according to claim 8, characterised in that the guiding grooves (40) of each anchor element (22) have sufficient play with respect to the guiding ribs (38) to enable, during the displacement of the anchor elements (22) brought about by the introduction of the push-in part (32) into the chambers (20), a rotation of each anchor element (22) from its substantially vertical position in the direction of the horizontal position.

10. Insert according to claim 7, characterised in that the guiding devices in each chamber (20) containing an anchor element (22) further have a ramp (46) which is arranged, in the region of the exit openings (28) which is not spanned by the guiding ribs (38), in such a way that the anchor element (22) in a final phase of its displacement comes into sliding contact with the ramp (46) and in so doing is displaced radially outwards.

11. Insert according to claim 10, characterised in that the ramps (46) are attached to the outer side of the inner hollow-cylindrical sleeve (12).

12. Insert according to claim 1, characterised in that part of the guiding devices in each chamber (20) containing an anchor element (22) is a stop (44) which is arranged at the axial end, opposite the pointed end (24) of the anchor element (22), of the associated exit opening (28) and guides the pointed end (24) of the anchor element (22), in the initial phase of its displacement, out through the associated exit opening (28).

13. Insert according to claim 12, characterised in that the stop (44), in the final phase of the displacement of the anchor element (22), fixes the horizontal end position of the anchor element (22).

14. Insert according to claim 1, characterised in that the push-in part (32) has, in a cover (34) closing the chambers (20), injection openings (48) which are in communication with the chambers (20).

* * * * *